United States Patent [19]
Easton

[11] Patent Number: 5,706,929
[45] Date of Patent: Jan. 13, 1998

[54] CONVEYOR WITH HIGH SPEED CASE TURNER

[75] Inventor: Richard L. Easton, St. Peters, Mo.

[73] Assignee: Alvey, Inc., St. Louis, Mo.

[21] Appl. No.: 422,875

[22] Filed: Apr. 17, 1995

[51] Int. Cl.⁶ ................................................. B65G 47/24
[52] U.S. Cl. ................................................. 198/415
[58] Field of Search ................................................. 198/415

[56] References Cited

U.S. PATENT DOCUMENTS

| | | | |
|---|---|---|---|
| 2,709,513 | 5/1955 | Weber et al. | 198/415 |
| 3,642,113 | 2/1972 | Burgis . | |
| 3,749,226 | 7/1973 | Meschke et al. | 198/415 |
| 3,758,104 | 9/1973 | Daily | 198/415 |
| 3,905,472 | 9/1975 | Schuster . | |
| 4,164,281 | 8/1979 | Schnier | 198/415 |
| 4,669,602 | 6/1987 | Oullette | 198/415 |
| 5,240,101 | 8/1993 | LeMay et al. . | |

FOREIGN PATENT DOCUMENTS

| | | | |
|---|---|---|---|
| 486043 | 5/1992 | European Pat. Off. | 198/415 |
| 1505-858-A | 9/1989 | Russian Federation . | |
| 587051 | 1/1978 | U.S.S.R. | 198/415 |

Primary Examiner—Karen B. Merritt
Assistant Examiner—Douglas Hess
Attorney, Agent, or Firm—Varnum, Riddering, Schmidt & Howlett LLP

[57] ABSTRACT

A roller conveyor is provided with a rotating turning wheel disposed along one side of the conveyor and engaging and turning products as the products are moved along the conveyor. The rotating wheel is provided with a conically-shaped upper surface having a lower edged disposed below the level of the plane of the conveyor. An adjustable guide bar directs products to an area of the wheel displaced from the outer edge of the wheel by a selected distance. As the product engages the wheel, a portion of the product is raised to facilitate turning of the product and a force extending in the direction of travel is applied to the product in the area of contact with the wheel. The wheel is mounted on a vertically extending shaft further having a drive disc mounted thereon. A drive wheel mounted on a horizontally extending shaft rotates the drive disc. A pulley mounted on the horizontal shaft is driven by the conveyor roller drive belt. The rotational speed of the wheel is adjustable relative to the speed of the conveyor by adjustment of the drive wheel on the horizontal shaft and is adjusted to advance products in the direction of travel at a speed slower than the speed of the conveyor.

20 Claims, 3 Drawing Sheets ved by the wheel 60, the corner 42 will be moved by the wheel in the direction of the exit end 35. The tangential

5,706,929

1
CONVEYOR WITH HIGH SPEED CASE TURNER

BACKGROUND ON THE INVENTION

1. Field of the Invention

The invention relates to conveyors for conveying piece goods and, more particularly, for conveyors adapted to change orientation of a product as the product moved is along the conveyor path.

2. Background Art

Products of various shapes are often loaded onto a conveyor in one orientation with respect to the direction of travel of the conveyor and must be turned before being unloaded from the conveyor. A typical prior art arrangement uses what is sometimes referred to as a "bump turner". The bump turner is essentially a fixed stop on the conveyor which engages one corner of the product as it is moved along the conveyor path. Bump turners can generally be used effectively when a rectangularly-shaped product is to be turned from an orientation wherein the longitudinal center of the product is transverse to the direction of travel to an orientation in which the longitudinal center line of the product is parallel to the direction of travel. However, bump turners are quite limited when a product is to be turned in the opposite direction, i.e., from an orientation in which the longitudinal center line is parallel to the direction of travel to an orientation in which the longitudinal center line is transverse to the direction of travel.

Split roller or belt conveyors have been used to turn products but these are typically expensive and time consuming. A further disadvantage of the known bump turner arrangement is that the forward motion of the product must be slowed to prevent product damage, as a consequence the total throughput of the conveyor is reduced.

SUMMARY OF THE INVENTION

These and other problems of the prior art are overcome in accordance with the principles of this invention by the use of a turning wheel which engages one side of a product being moved along the conveyor. The turning wheel engages one side of the product and displaces the one side in the direction of travel and causes the product to be turned from an original orientation to a new orientation. The extent to which the product is turned may be controlled as a function of the speed of the turning wheel relative to the speed of the conveyor which is preferably such that the tangential speed of a portion of the wheel engaging the product is less than the speed of the conveyor medium. Advantageously, the wheel turns the product without stopping or significantly reducing forward movement of the product. The wheel is preferably mounted along one side of the conveyor and preferably provided with a conically-shaped upper surface. An outer edge of the upper surface is preferably positioned at or below the level of the plane of the conveyor. Advantageously, in such an arrangement one end of the product tends to ride up on the wheel as the conveyor is advanced, thereby facilitating the turning of the product.

An adjustable side guide may be used to direct the product onto the wheel which is preferably in the shape of a relatively flat cone, representing a sloping surface in cross section. Advantageously, the speed of rotation of the wheel may be adjusted to accommodate products of different dimensions, weight, etc. Advantageously, the wheel may be driven from the conveyor drive mechanism, with a speed-adjusting arrangement, or maybe separately driven by means of a variable speed electrical motor.

2
BRIEF DESCRIPTION OF THE DRAWING

An embodiment of the invention is described below with reference to the drawing in which.

DETAILED DESCRIPTION

Figure 1:
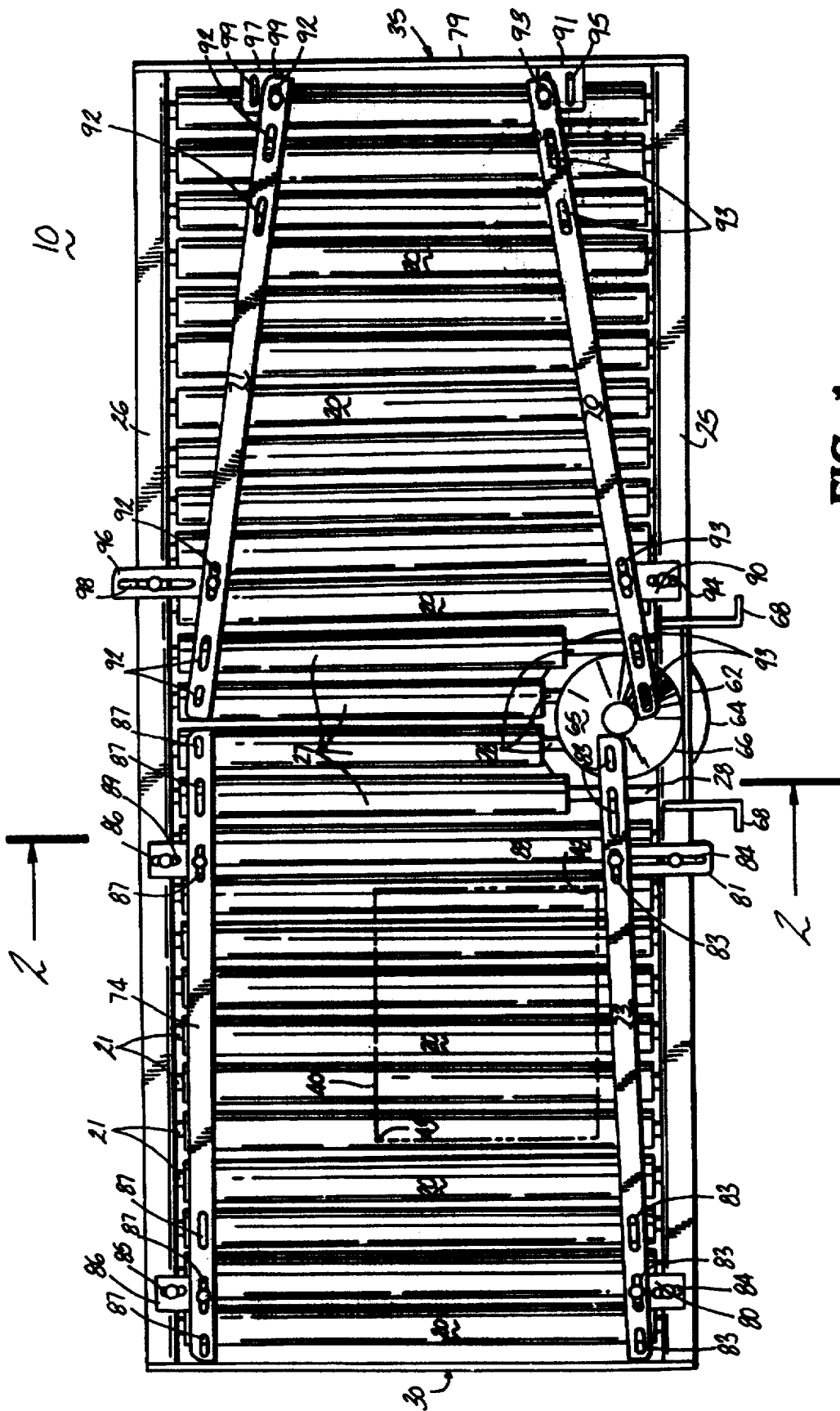
FIG. 1 is a partial plan view of a conveyor assembly incorporating the product-turning disc of the invention.

FIG. 1 is a plan view of a conveyor section 10 incorporating the product turning apparatus in accordance with the invention. In the present embodiment, the conveyor 10 includes a plurality of standard length rollers 20 mounted on roller shafts 21 in a standard manner, with the ends of the roller shafts supported in opposite side walls 25, 26 of the conveyor section 10. The conveyor section 10 comprises an entry end 30 and an exit end 35 and a product, such as product 40, is moved along a product travel path on the conveyor in a direction of travel extending from entry end 30 to the exit end 35. The conveyor section 10 is provided with a rotatable product-turning wheel 60 disposed along one side of the conveyor. Shortened conveyor rollers 27 are disposed in the area adjacent the wheel 60 and are provided with extra long shafts 28 which extend below the wheel 60 and are supported in an area of side wall 25 below the wheel 60. As described further later herein with reference to FIG. 2, the wheel 60 is connected by means of a vertical shaft to a drive disc 64 extending below wheel 60. Brackets 68 are mounted on conveyor side wall 25 to support a safety guard (not shown in the drawing) to partially cover the wheel 60 when the unit is fully assembled.

The rotating wheel 60 is rotated in a direction such that the wheel has a tangential velocity, in the area of the wheel adjacent the product travel path, in the direction of travel of the product. When a product 40 moves along the product travel path and a portion of the product such as corner 42 is engaged by the wheel 60, the corner 42 will be moved by the wheel in the direction of the exit end 35. The tangential velocity of the portion of the wheel contacted by the product is preferably less than the speed of the conveyor so as to slow, but not stop the part of the product engaging the wheel. This causes the product to turn in a clockwise direction, as viewed in FIG. 1. The wheel 60 is preferably provided with a conically-shaped upper surface 65. The outer edge 66 of the wheel 60 is preferably positioned below a conveyor plane defined by the upper surface of rollers 20,27 to cause the product 40 to ride up on the wheel as the product is moved along the product travel path. This action causes the side 45 of the product to be elevated above the plane of the conveyor, thereby facilitating the turning of the product without specifically slowing the forward motion of the product.

As described further later herein, the rate of rotation of the wheel 60 is adjustable and the degree of rotation to be obtained, as the product advances past the wheel, may be controlled by adjustment of the speed of the wheel relative to the forward speed of the product. The extent to which the product is rotated is also a function of the friction between the wheel 60 and the product 40 and thus, will vary with products of different weights and frictional surface coefficients. It has been found experimentally that the present product turning arrangement is readily adjustable for products of substantially equal weight and surface coefficients, such that products are consistently turned 90°, plus or minus 10°.

In order to facilitate the turning of products by means of wheel 60, a guide bar 73 is mounted on the side wall 25 by means of brackets 80 and 81. The bar 73 is provided with a plurality of slotted openings 83 to allow the bar 73 to be adjustably positioned with respect to the wheel 60. Brackets 80 and 81 are provided with slotted openings 84 to allow the bar 71 to be adjustably positioned with respect to side wall 25. Bar 73, which may for example be a U-shaped metallic bar, is adjusted such that the product 40 engages the wheel at a desired position to obtain the desired amount of lift and rotation. It will be apparent that the amount of rotation obtained at a predetermined speed of rotation of the wheel 60 is a function of the distance of the point of engagement of the product with the wheel. Bar 73 may be adjusted to control the point of engagement. Adjustment bar 74 is mounted on the opposite side wall 26 and may be adjusted to further guide the product. Adjustment bar 74 may be adjustable positioned by means of brackets 86 and 87 which are provided with slotted openings 85 and 89 and engaging corresponding slotted openings 87 in bar 74.

A pair of guide bars 70 and 71 extend from the area of the rotating wheel toward the exit end 35 and are provided to adjust the orientation of a product which has been turned somewhat more or less than 90°. Bar 70 is adjustably supported by means of brackets 90 and 91. Bar 70 is provided with slotted openings 93 and brackets 90 and 91 are provided with slotted openings 94 and 95, respectively, to allow for the positional adjustment of the bar 70. Bar 71 is adjustably supported by brackets 96 and 97. Bar 71 is provided with slotted openings 92 and brackets 96 and 97 are provided with slotted openings 98 and 99, respectively, to provide for adjustable mounting of the bar 71. The brackets 80, 81, 85, 86, 90, and 96 are mounted on the sides 25 and 26 in a raised position, such that the bars 70, 71, 73, and 74 are raised above the highest level of the conically-shaped upper surface 65 of the rotating wheel 60. Brackets 91 and 97 may be L-shaped brackets mounted on a vertically extending end plate 79.

Figure 2:
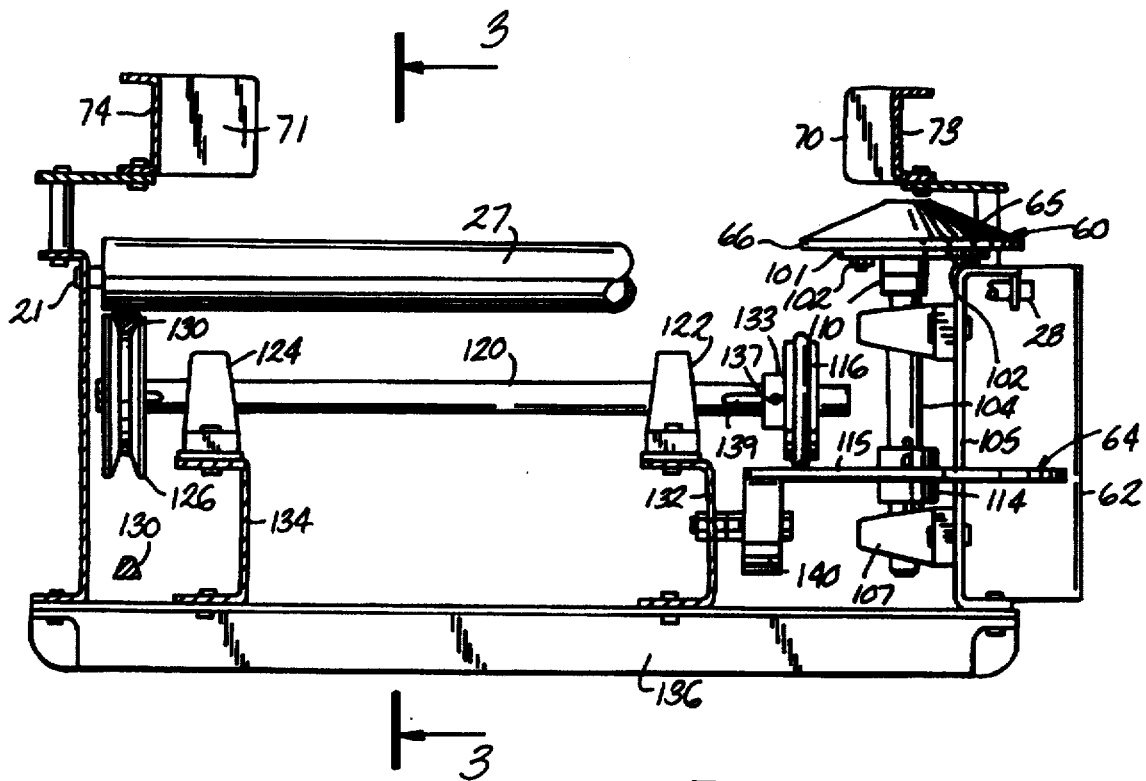
FIG. 2 is a sectional view along line 2—2 of FIG. 1.

FIG. 2 is a cross-sectional view along line 2—2 of FIG. 1. FIG. 2 shows the rotating wheel 60 with the conically-shaped upper surface 65. The angle of the upper surface from horizontal is a matter of design choice and may, for example, be on the order of 20°. The rotating wheel may be constructed of machined steel or a hard plastic or the like, preferably with a surface that provides a substantial friction when engaged by a product to be rotated. The outer edge 66 of the sloping upper surface 65, forming the starting point of the incline, is preferably a small distance, e.g., 1/16 of an inch, below the plane of the conveyor defined by the upper surface of the rollers 20, 27. The wheel 60 is mounted on a disc support plate 101 by means of mounting bolts 102. The disc support plate 101 is mounted on a shaft 104 by means of a collar 110. The shaft 104 is supported in upper and lower support bearings 106 and 107, respectively, mounted on a vertically extending bracket 105. The shaft 104 engages the lower drive disc 64 by means of an adjustable collar 114, that has a lower surface engaging an upper surface of the bearing 107. The position of the outer edge 66 of the wheel 60 may be adjusted relative to the upper surface of rollers 27 by adjustment of the shaft 104 in the collar 114. The lower drive disc 64 is rotated in the horizontal plane by means of a drive wheel 116, provided with a urethane ring 118 which engages the upper surface 115 of lower disc 64. Drive wheel 116 is mounted on a horizontally extending drive shaft 120 supported in shaft support bearings 122 and 124. The end of the drive shaft 120 opposite of the one end to which the drive wheel 116 is mounted is provided with a pulley 126.

Figure 3:
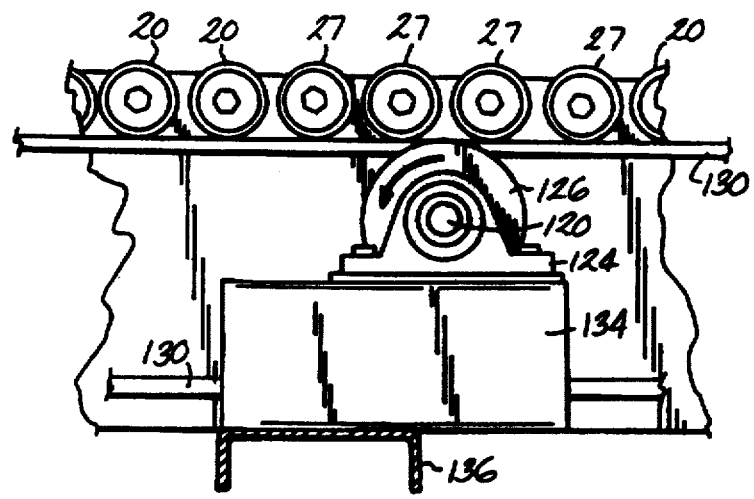
FIG. 3 is a partial cross-sectional view along line 3—3 of FIG. 2.

As depicted in side elevation in FIG. 3, the rollers 20, 27 are driven by means of a drive belt 130 extending over a drive sheave and an idler sheave (not shown in the drawing) at opposing ends of the conveyor in a standard, well-known manner. The belt 130 extends along the lower side of the rollers 20, 27 to drive the rollers. The belt 130 also drives the pulley 126, thereby driving the wheel 60 via shaft 120, drive wheel 116, lower disc 64, and shaft 104. The shaft support bearings 122 and 124 are mounted on a support plate 136 via support brackets 134 and 132, respectively. In a similar fashion, shaft support bearings 106 and 107 are mounted on a vertical support bracket 105 which, in turn, is mounted on support plate 136. A roller 140 is also mounted on the support bracket 132 and provides a counteracting force to the downward force applied by the drive wheel 116 on the lower disc 64, thereby providing stability to the lower disc 64.

Since the pulley 126 is driven by means of a drive belt 130 which also drives rollers 20, 27, the speed of rotation of the wheel 60 is increased and decreased in correlation with changes in the speed of the conveyor. The drive shaft 120 is provided with an axially extending slot 139 and drive wheel 116 is adjustably mounted on shaft 120 by means of set screw 137. The speed of the wheel 60 relative to the speed of the conveyor rollers 20, 27 may be adjusted by lateral movement of the drive wheel 116 on drive shaft 120. As the drive wheel 116 is positionally adjusted to engage the lower disc 64 at a position closer to the shaft 104, the speed of the wheel 60 is increased. Similarly, as the drive wheel 116 is removed away from the center of lower disc 64, the speed of the wheel 60 is reduced.

Figure 4:
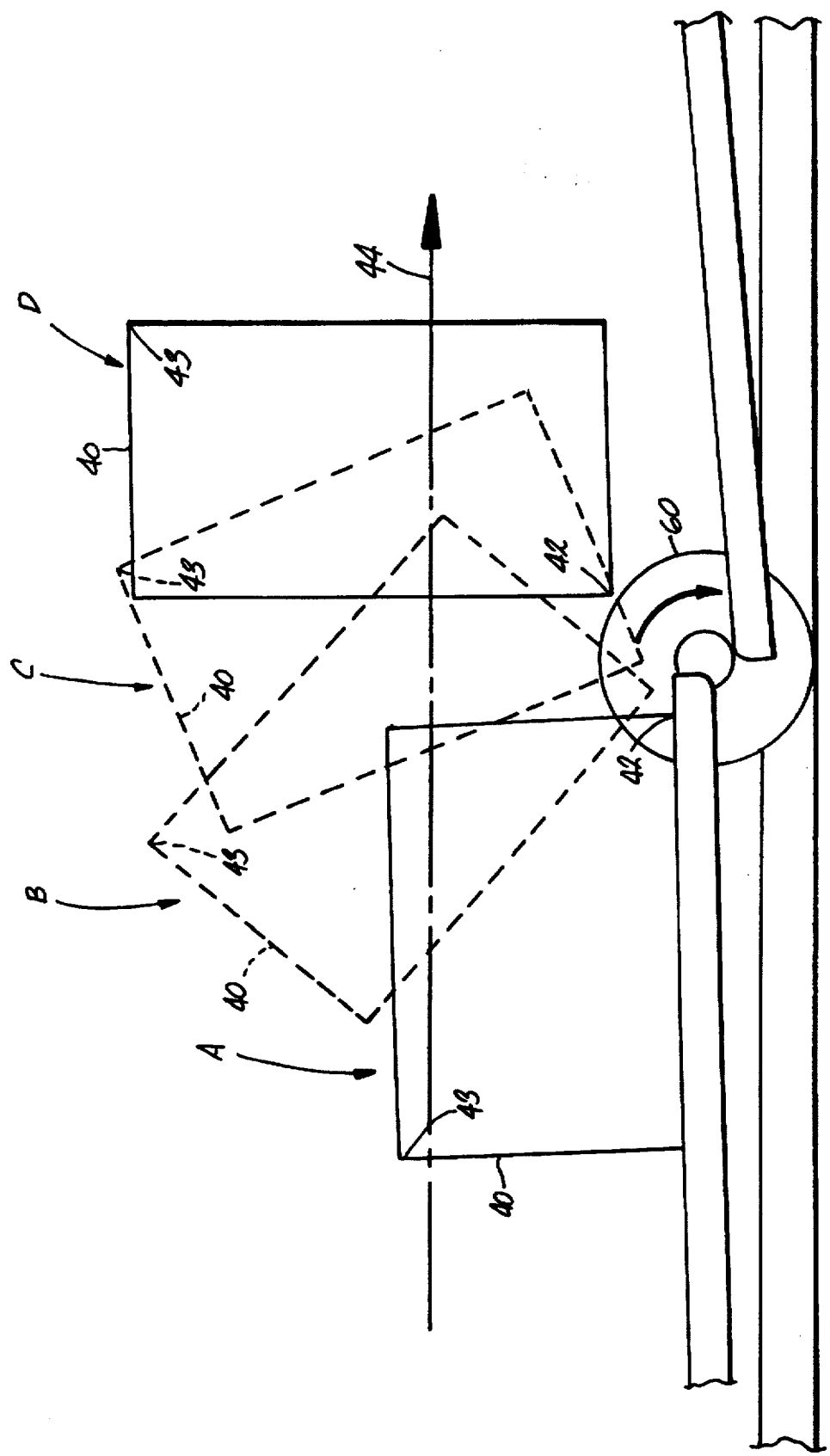
FIG. 4 is a diagrammatic representation of a product turning sequence.

FIG. 4 is a a diagrammatic representation of movement of a product 40 relative to the conveyor as the product is turned by operation of the wheel 60. The product is moved along the conveyor in the direction indicated by the arrow 44 and at the normal speed of the conveyor. As the product 40 advances along guide bar 73, a corner 42 engages the wheel 60. The wheel 60 is rotated in the clockwise direction, as shown in FIG. 4. However, the speed of rotation of the wheel is such that the portion of the wheel 60 engaging the corner 42 advances in the direction of arrow 44 at a slower rate than an opposite corner 43 of the product 40 which advances at the normal speed of the conveyor. Consequently, the product 40 tends to turn to the positions B, C, and D, as shown in FIG. 4, as the product advances along the conveyor. As mentioned earlier, the wheel 60 is provided with a sloping upper surface such that the corner 42 is elevated as the product 40 engages the wheel 60, thereby raising the portion of the product 40 adjacent the corner 42 and facilitating the turning of the product.

The degree of rotation of the product, as the product 20 engages the wheel 60, is a function of the forward speed of the conveyor as well as the speed of rotation of the wheel 60 relative to the speed of the conveyor. The point of engagement between the wheel 60 and the product, which may be adjustably controlled by means of guide bar 73, also significantly affects the degree of rotation which takes place as the product is moved along the conveyor. It will be apparent that the forward speed of the corner 42 is reduced as the point of engagement is moved toward the center of the wheel 60. The speed of rotation of the product 40 is also a function of the friction between the upper surface of the wheel 60 and the product. The relative speed of rotation of the wheel 60 and the position of bar 73 are preferably empirically determined. In one particular conveyor configuration employing the rotating wheel of the present invention, the throughput of turned products was between three and four times greater than the throughput using prior art methods.

It is to be understood that the above-described arrangement is merely illustrative of the application of the principles of the invention, and other arrangements may be devised by those skilled in the art without departing invention from the scope of the invention as defined by the appended claims.

What I claim is:

1. A roller conveyor comprising:
 a conveyor frame having opposing side walls and an entrance end and an exit end;
 a conveyor medium mounted between the side walls and defining a conveyor plane for conveying products in a direction of travel from the entrance end to the exit end;
 an opening in the conveyor plane adjacent one of the side walls;
 a turning wheel rotatably mounted on a vertical axis within the opening adjacent the one side wall and having an inner edge adjacent the one wall and an outer edge opposite the inner edge and displaced from the one wall;
 turning wheel drive apparatus linked to the turning wheel and operative to rotate the turning wheel in a direction of rotation such that a portion of the turning wheels outer perimeter along the outer edge moves in the direction of travel, the turning wheel operative to displace a portion of a product contacting the wheel in the direction of travel;
 the turning wheel comprising a conically-shaped upper surface.

2. The conveyor in accordance with claim 1 wherein a portion of the conically-shaped upper surface is disposed below the conveyor plane.

3. The conveyor in accordance with claim 1 and further comprising a guide bar disposed between the entry end and the turning wheel and mounted on the one side wall and angularly displaced from the one side wall to direct products away from the one side wall and toward a center portion of the turning wheel.

4. The conveyor in accordance with claim 3 and further comprising a pair of guide bars mounted on the opposing walls and disposed between the turning wheel and the exit end, the pair of bars each having one end adjacent the exit end and displaced angularly from the opposing walls to form a narrowed opening adjacent the exit end, whereby the pair of bars assist in turning a product partially turned by the turning wheel.

5. A roller conveyor comprising:
 a conveyor frame having opposing side walls and an entrance end and an exit end;
 a conveyor medium mounted between the opposing side walls and defining a conveyor plane for conveying products in a direction of travel from the entrance end to the exit end;
 an opening in the conveyor plane adjacent one of the side walls having an inner edge adjacent the one side wall and an outer edge displaced from the one side wall;
 a conveyor drive mechanism for driving the conveyor medium at a predetermined speed;
 a turning wheel rotatably mounted on a vertical axis within the opening;
 turning wheel drive apparatus linked to the turning wheel and operative to rotate the turning wheel at a selected speed and in a direction of rotation such that a portion of the turning wheel's outer perimeter along the outer edge moves in the direction of travel, the turning wheel operative to displace a portion of a product contacting the wheel in the direction of travel;
 the turning wheel drive apparatus being adjusted such that the selected speed of the turning wheel is less than the predetermined speed, whereby products conveyed on the conveyor medium and engaging the turning wheel are rotated in a direction of rotation opposite the direction of rotation of the turning wheel.

6. A roller conveyor comprising:
 a conveyor frame having opposing side walls and an entrance end and an exit end;
 a conveyor medium mounted between the opposing side walls and defining a conveyor plane for conveying products in a direction of travel from the entrance end to the exit end;
 an opening in the conveyor plane adjacent one of the side walls having an inner edge adjacent the one side wall and having an outer edge opposite the inner edge and displaced from the one side wall;
 a turning wheel rotatably mounted in the opening adjacent the one side wall and having an outer perimeter;
 a turning wheel drive mechanism linked to the turning wheel and operative to rotate the turning wheel in a direction of rotation such that a portion of the turning wheel's outer perimeter adjacent the outer edge of the opening moves in the direction of travel, the turning wheel operative to displace a portion of a product contacting the wheel in the direction of travel;
 the turning wheel drive mechanism comprising a vertically extending shaft having one end engaging the turning wheel and having an opposite end and a lower disc engaging the vertical shaft adjacent the opposite end, the drive mechanism further comprising a horizontally extending drive shaft and a drive wheel mounted on one end of the drive shaft and engaging an upper surface of the lower disc.

7. The conveyor in accordance with claim 6 wherein the horizontally extending drive shaft is rotated at a selected speed of rotation and the drive wheel is adjustably mounted on the horizontally extending drive shaft and is movable along a longitudinal center line of the horizontally extending drive shaft, whereby the speed of rotation of the turning wheel is adjusted relative to the speed of rotation of the horizontally extending drive shaft by selectively adjusting the position of the drive wheel on the horizontally extending drive shaft.

8. The roller conveyor in accordance with claim 7 and further comprising a conveyor drive belt for driving the conveyor medium at a selected speed and further comprising a drive pulley mounted on an opposite end of the horizontally extending drive shaft opposite the one end of the horizontally extending drive shaft, the drive pulley being driven by the drive belt, whereby the speed of rotation of the turning wheel is coordinated with the speed of the conveyor medium.

9. A conveyor comprising:
 a conveyor frame having opposing side walls and an entrance end and an exit end;
 a conveyor medium mounted between the opposing side walls and defining a conveyor plane for conveying products in a direction of travel from the entrance end to the exit end;
 an opening in the conveyor plane adjacent one of the side walls having an inner edge adjacent the one side wall and an outer edge displaced from the one side wall;

a turning wheel rotatably mounted in the opening adjacent the one side wall and having an axis of rotation substantially perpendicular to the conveyor plane and comprising a conically-shaped upper surface; and turning wheel drive apparatus linked to the turning wheel and operative to rotate the turning wheel.

10. The conveyor in accordance with claim 9 and further comprising a conveyor medium drive mechanism for driving the conveyor medium at a selected speed and the turning wheel drive apparatus is an adjustable speed drive apparatus for driving the turning wheel at various rotational speeds selectively adjustable relative to the speed of the conveyor medium.

11. The conveyor in accordance with claim 9 and further comprising a conveyor medium drive apparatus for driving the conveyor medium and wherein the turning wheel drive apparatus is driven from the conveyor drive apparatus.

12. The conveyor in accordance with claim 9 wherein the conveyor medium comprises a plurality of rollers defining the conveyor plane.

13. The conveyor in accordance with claim 12 wherein the plurality of rollers comprises certain rollers of predetermined length extending between the opposing side walls and other rollers having a length less than the predetermined length adjacent the opening adjacent the one side wall.

14. The conveyor in accordance with claim 13 wherein the plurality of rollers are supported on roller shafts and wherein the roller shafts supporting the other rollers extend through said opening.

15. The conveyor in accordance with claim 9 wherein the turning wheel comprises an outer edge disposed below the conveyor plane whereby portions of products contacting the wheel are elevated above the conveyor plane to facilitate turning of the products.

16. A method of turning a product, traveling along a path of travel on a conveyor having opposite sides, from a first orientation relative to the path of travel to a second orientation relative to the path of travel, the method comprising the steps of:

advancing the product along the path of travel;

engaging a part of the product adjacent one of the opposing sides by a turning wheel mounted on a vertical axis and having a conically-shaped upper surface;

guiding the product onto the upper surface and toward a center portion of the wheel; and turning the part of the product adjacent the one of the opposite sides by the turning wheel in the direction of travel.

17. The method in accordance with claim 16 wherein the wheel has an outer perimeter and further comprising the step of rotating the turning wheel in a direction of rotation such that a portion of the outer perimeter adjacent the product moves in the direction of travel.

18. The method in accordance with claim 16 wherein the conveyor comprises a plurality of conveyor rollers driven at a selected speed and the method further comprises the step of driving the turning wheel at a rate of rotation directly related to the selected speed of the rollers.

19. A method of turning a product, traveling along a path of travel on a conveyor having opposite sides, from a first orientation relative to the path of travel to a second orientation relative to the path of travel, the method comprising the steps of:

advancing the product along the path of travel;

engaging a part of the product adjacent one of the opposing sides by a turning wheel having a conically-shaped upper surface rotatably mounted on a vertical axis; and guiding the product onto a sloping surface of the conically shaped upper surface, whereby a portion of the product is elevated.

20. A method of turning a product, traveling along a path of travel on a conveyor having opposite sides, from a first orientation relative to the path of travel to a second orientation relative to the path of travel, the method comprising the steps of:

advancing the product along the path of travel;

engaging a part of the product adjacent one of the opposing sides by a conically shaped turning wheel rotatably mounted on a vertical axis;

turning the part of the product adjacent the one of the opposite sides by the turning wheel in the direction of travel; and advancing the product along the path of travel at a predetermined speed and turning the turning wheel at a selected speed such that the part of a product turned by the wheel advances along the path of travel at a speed slower than the predetermined speed.

* * * * *

UNITED STATES PATENT AND TRADEMARK OFFICE
CERTIFICATE OF CORRECTION

PATENT NO. : 5,706,929
DATED : 01/13/98
INVENTOR(S) : RICHARD L. EASTON

It is certified that error appears in the above-indentified patent and that said Letters Patent is hereby corrected as shown below:

```
Col. 5, claim 1, line 27:
     delete "wheels" and insert --wheel's--
```

Signed and Sealed this

Thirty-first Day of March, 1998

*Attest:*

BRUCE LEHMAN

*Attesting Officer*       *Commissioner of Patents and Trademarks*